US006237781B1

(12) United States Patent
Dahl

(10) Patent No.: US 6,237,781 B1
(45) Date of Patent: May 29, 2001

(54) DEVICE FOR ELEVATING ARTICLES FOR STORAGE WITHIN A GARAGE

(76) Inventor: Thomas F. Dahl, 15433 Seward St., Omaha, NE (US) 68154

( * ) Notice: Subject to any disclaimer, the term of this patent is extended or adjusted under 35 U.S.C. 154(b) by 0 days.

(21) Appl. No.: 09/348,689

(22) Filed: Jul. 7, 1999

(51) Int. Cl.$^7$ ................................................ A47F 7/00
(52) U.S. Cl. .............................................. 211/17; 248/320
(58) Field of Search ........................ 211/17, 1.51, 1.57, 211/117, 20; 248/317, 320, 322

(56) References Cited

U.S. PATENT DOCUMENTS

| D. 353,353 | 12/1994 | Katsaros . | |
|---|---|---|---|
| 2,614,704 | * 11/1952 | Winslow | 211/176 |
| 2,907,872 | * 10/1959 | Wilson | 248/320 |
| 2,953,969 | * 9/1960 | Pepple | 88/92 |
| 3,035,804 | * 5/1962 | Wilson | 248/320 |
| 3,770,133 | 11/1973 | Kolker . | |
| 3,907,113 | 9/1975 | Kropelnitski . | |
| 5,016,762 | * 5/1991 | Tsabar | 211/1.51 X |
| 5,031,085 | 7/1991 | Rustin . | |
| 5,183,162 | 2/1993 | Ritzenthaler . | |
| 5,199,843 | 4/1993 | Sferra . | |
| 5,294,006 | 3/1994 | Deschino . | |
| 5,402,979 | * 4/1995 | Bellamy | 248/322 X |
| 5,474,189 | 12/1995 | Peterson . | |
| 5,794,793 | 8/1998 | Frederick . | |
| 5,803,149 | 9/1998 | Halley et al. . | |
| 5,845,788 | * 12/1998 | Robolin | 211/17 |
| 5,979,671 | * 11/1999 | Pan et al. | 211/1.57 |

* cited by examiner

Primary Examiner—Daniel P. Stodola
Assistant Examiner—Khoa Tran
(74) Attorney, Agent, or Firm—Zarley, McKee, Thomte, Voorhees & Sease; Dennis L. Thomte

(57) ABSTRACT

A device for elevating articles for storage within a garage having a floor and a ceiling structure comprising an elongated, generally horizontally disposed support having hooks positioned thereon for supporting the articles to be stored thereon. A winch is secured to the support for raising and lowering the support from a position adjacent the garage floor to a position above the garage floor so that the articles are stored adjacent the ceiling of the garage to enable the garage to be used for its intended purpose.

11 Claims, 3 Drawing Sheets

DEVICE FOR ELEVATING ARTICLES FOR STORAGE WITHIN A GARAGE

BACKGROUND OF THE INVENTION

1. Field of the Invention

This invention relates to a device for use in a garage for supporting one or more articles thereon so that the articles may be raised from the garage floor to a storage position thereabove.

2. Description of the Related Art

Residential garages are normally filled with bicycles, tricycles, lawn chairs, lawn mowers, snow blowers, etc., which makes it difficult and inconvenient to use the garage for its intended purpose, that is, the parking of vehicles therein.

Many prior art attempts have been made to solve the problem of storing the articles described above in garages, but they have apparently met with little or no success. One prior art device utilizes J-shaped hooks screwed into the ceiling structure which requires that the articles be manually lifted overhead and supported on the hook or hooks. The lifting of the articles, such as bicycles or the like, onto the hook or hooks is difficult, inconvenient and dangerous. Another prior art attempt at storing bicycles in a garage is to provide a vertical post which is floor-supported and upon which the bicycles are supported. Devices of this type do not sufficiently raise the bicycles to a position where they do not interfere with the parking of the vehicles in the garage. Further, devices of this type require that the bicycles be manually lifted onto the supporting post and manually removed therefrom, which is difficult and inconvenient. Further, the supporting structure itself occupies space within the garage.

Other attempts have also been made to solve the problems identified hereinabove, but those attempts are believed to be too complicated, expensive, impractical and inconvenient to meet with customer acceptance.

SUMMARY OF THE INVENTION

A device is described for elevating articles for storage within a garage having a floor and a ceiling structure. The device comprises an elongated, generally horizontally disposed support which includes a plurality of hooks or the like thereon for supporting the articles to be stored thereon. A positioning means, such as a winch means, is secured to the ceiling or wall of the garage and is connected to the elongated support for vertically moving the support with respect to the garage floor. The elongated support is initially positioned adjacent the floor of the garage and the bicycles, tricycles, etc., are mounted on the hooks or the like on the support. The positioning means is then actuated to raise the support, and the articles supported thereon, from a position on the floor of the garage to a storage position thereabove. When the articles are supported adjacent the ceiling structure of the garage, the articles do not interfere with the normal use of the garage.

It is therefore a principal object of the invention to provide an improved device for storing articles within a garage.

Still another object of the invention is to provide a device for elevating articles for storage within a garage from a floor position to an elevated storage position.

Yet another object of the invention is to provide a device of the type described above which does not require that the bicycles, tricycles, etc., be manually lifted overhead, as is the case with prior art devices.

Still another object of the invention is to provide a device for elevating articles for storage within a garage including a winch means which may be either mechanically operated or electrically operated.

Still another object of the invention is to provide a device of the type described above which is safe and convenient to use.

These and other objects of the present invention will be obvious to those skilled in the art.

DESCRIPTION OF THE PREFERRED EMBODIMENT

Figure 1:
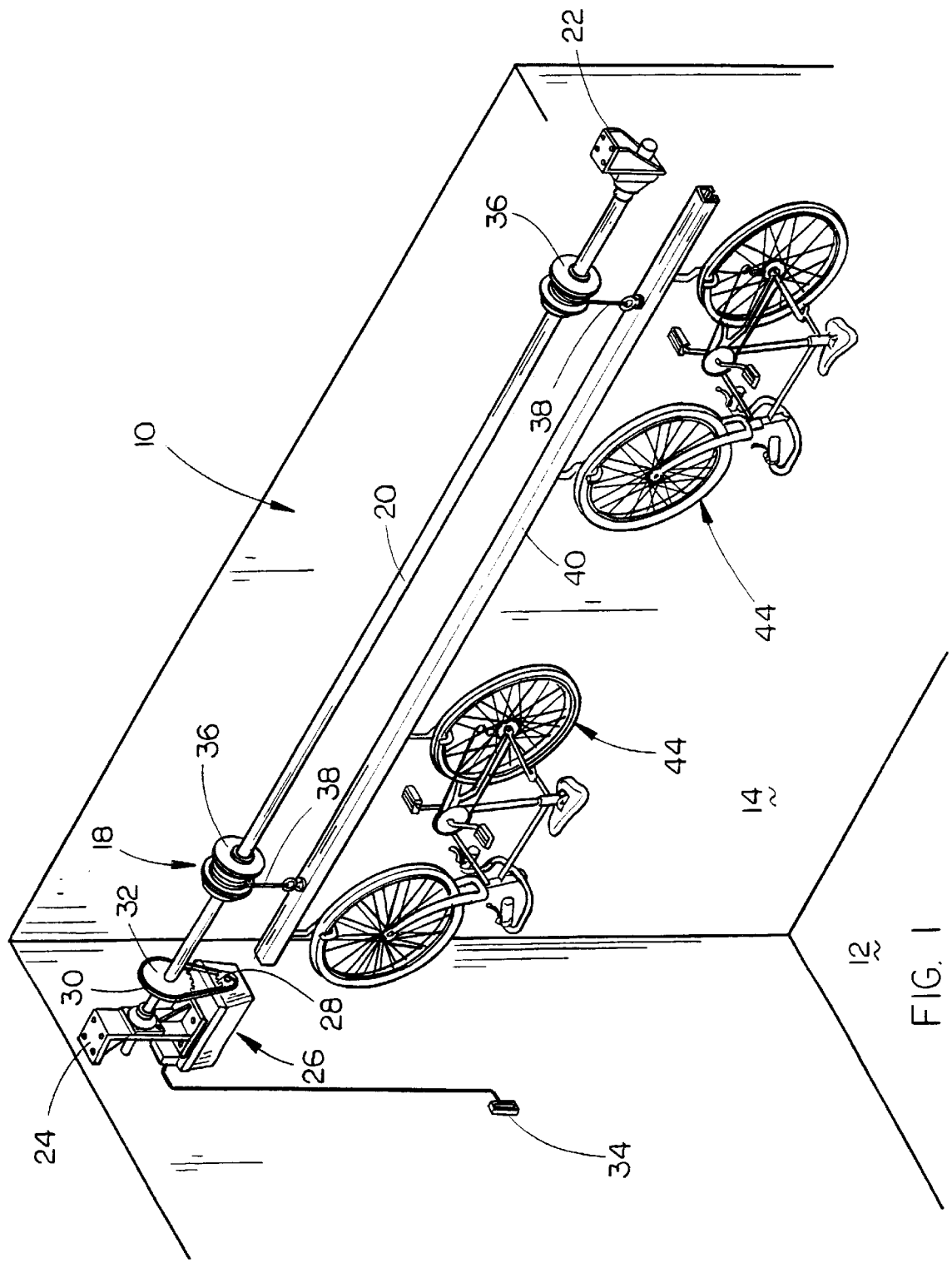
FIG. 1 is a perspective view illustrating the device of this invention being utilized to support bicycles above the floor of a garage.
Figure 2:
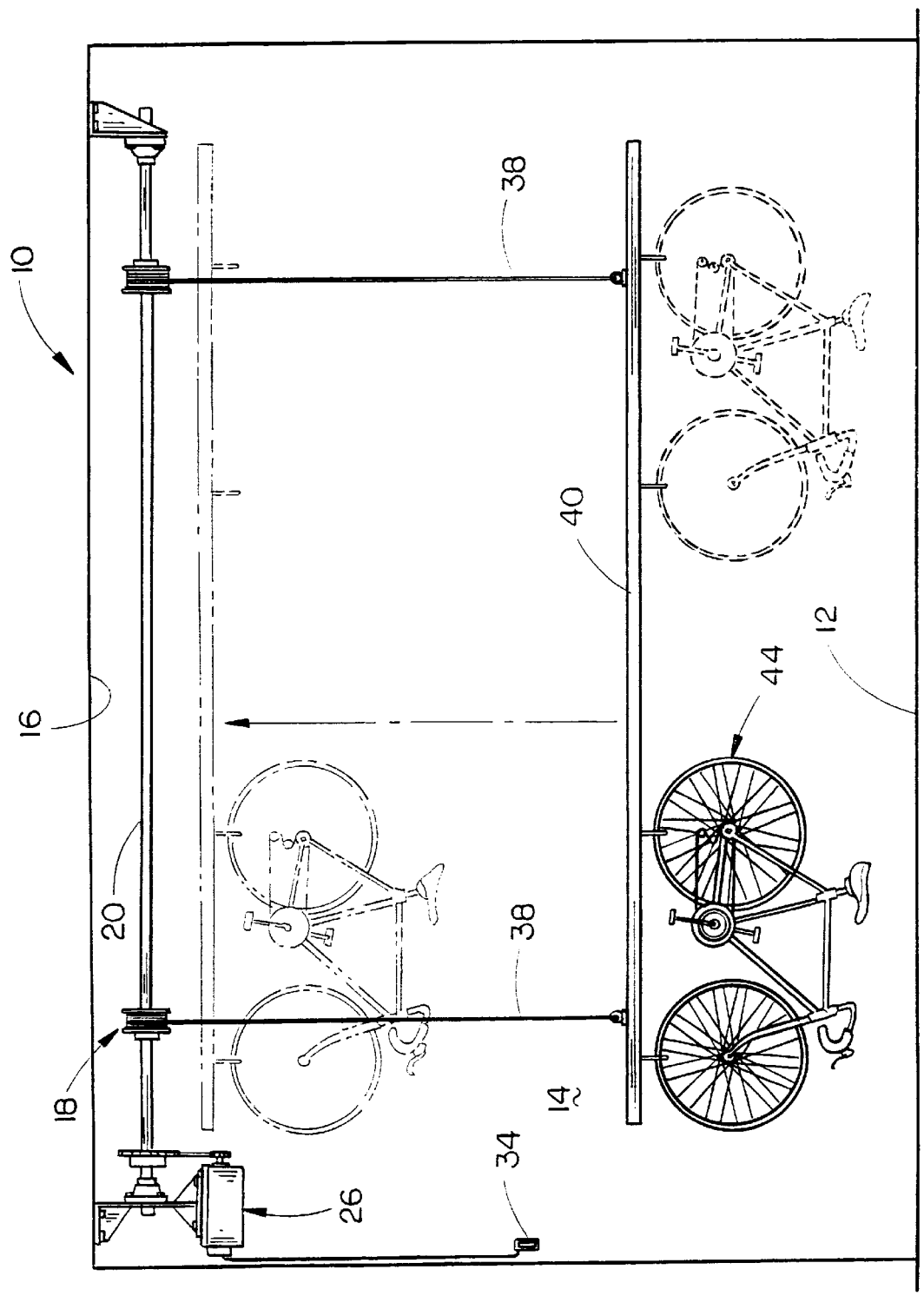
FIG. 2 is a side view of the device illustrating the manner in which the support and the bicycles supported thereon are moved from a position adjacent the garage floor to a position adjacent the garage ceiling.
Figure 3:
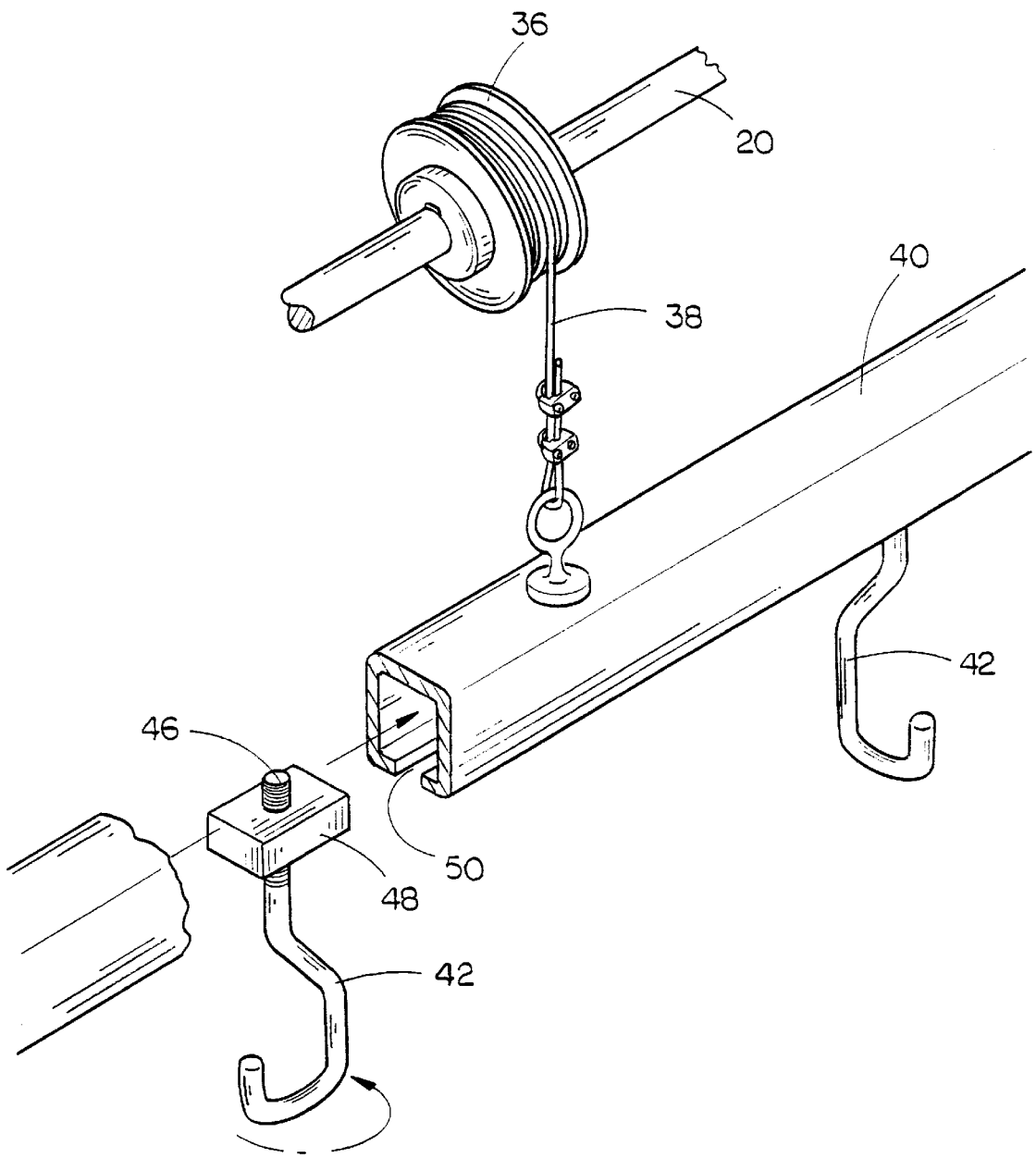
FIG. 3 is a partial perspective view illustrating a portion of the invention.

The numeral 10 refers generally to a garage or the like including a floor 12, upstanding walls 14 and a ceiling structure 16.

The apparatus of this invention is referred to generally by the reference numeral 18 with the apparatus being designed to elevate articles to be stored from a position adjacent the floor of the garage to a position adjacent the ceiling of the garage. Although the apparatus 18 is illustrated in the drawings as being secured to the ceiling structure of the garage, the apparatus of this invention could also be secured to a pair of opposite walls of the garage or could be secured to one wall of the garage and the ceiling structure.

Apparatus 18 includes an elongated, horizontally disposed support shaft 20 which is rotatably mounted at one end to the ceiling 16 by means of a bracket 22. Bracket 24 rotatably supports the other end of the support shaft 20 and also supports a motor structure 26 having a sprocket 28 operatively secured thereto for rotation with the power shaft of the motor. Chain 30 extends around sprocket 28 and also extends around sprocket 32 which is affixed to the support shaft 20 so that rotation of the sprocket 28 by the motor will cause rotation of the sprocket 32 and the support shaft 20. A suitable motor structure would be the commonly used garage door opener motor structures. The motor structure 26 is controllable by means of a switch 34 which is conveniently located to enable the apparatus to be operated. It is recommended that the switch 34 be sufficiently positioned above the floor 12 so that small children will not be able to operate the same.

A plurality of reels or drums 36 are affixed to the support shaft 20 for rotation therewith and have a cable 38 associated therewith which may be either wound upon the reels 36 or unwound therefrom, depending upon the rotation of the support shaft 20. The lower ends of the cables 38 are secured to a support 40, as illustrated in the drawings. A plurality of support hooks 42 are operatively secured to the support 40 for supporting the articles to be stored, such as bicycles 44. Although the support hooks 42 may take almost any shape, it is preferred that the hooks 42 have a threaded upper end 46 which is threadably secured to a slide block 48 received within the interior of the support 40 with the shank portion of the hook 42 extending downwardly through the elongated opening 50 formed in the underside of the support 40. The hooks 42 are selectively slidably mounted within the support 40 so that they may be positioned at any location along the length of the support shaft 20.

The apparatus of this invention is used as follows. The switch 34 is energized to actuate the motor structure 26, thereby causing the support shaft 20 to be rotated in a counterclockwise direction, as viewed in FIG. 1, so that the cables 38 unwind from the reels 36 which causes the support 40 to be lowered towards the garage floor. When the support 40 has been lowered to the desired position, the articles to be stored thereon are secured to the hooks 42. The motor structure 26 is then actuated to cause the support shaft 20 to be rotated in a clockwise direction, as viewed in FIG. 1, so that the cables 38 are wound upon the reels 36 to raise the support 40 and the bicycles 44 thereon to a position above the floor of the garage so that the articles do not interfere with the normal use of the garage.

Although the means for raising and lowering the support 40 is illustrated and described as being an electrical motor structure, the support rod 20 could be rotated by means of a manual winch mounted on one of the walls of the garage or could be comprised of a crank-type winch such as commonly used to raise and lower awnings or the like.

Thus it can be seen that a novel apparatus has been provided for elevating articles for storage within a garage.

Thus it can be seen that the invention accomplishes at least all of its stated objectives.

I claim:

1. A device for elevating articles for storage within a garage having a floor, a wall structure and a ceiling structure, comprising:

an elongated, generally horizontally disposed support suspended from one of the ceiling structure and the wall structure;

support means on said support for supporting the articles to be stored thereon;

vertical positioning means operatively secured to said support for raising said support towards the ceiling structure of the garage to a first suspended storage position and for lowering said support towards the floor of the garage.

2. The device of claim 1 wherein said support means comprises a plurality of hooks selectively slidably mounted on said support.

3. The device of claim 1 wherein said support is adapted to be positioned adjacent the ceiling structure when in its said first storage position.

4. The device of claim 1 wherein said positioning means comprises a cable secured to said support and extending upwardly therefrom towards the ceiling structure.

5. The device of claim 4 wherein said cable means comprises a plurality of spaced-apart cables.

6. The device of claim 1 wherein said positioning means comprises a winch.

7. The device of claim 6 wherein said winch is electrically driven.

8. The device of claim 6 wherein said winch means is adapted to be positioned adjacent the ceiling structure.

9. The device of claim 1 wherein said positioning means comprises a horizontally disposed and selectively rotatable shaft operatively secured to and supported by either the ceiling structure or the wall structure and wherein a plurality of cables are selectively wound upon and unwound from said rotatable shaft; said cables being secured to said support.

10. The device of claim 9 wherein said shaft is mechanically rotated.

11. The device of claim 9 wherein said shaft is electrically rotated.

* * * * *